United States Patent [19]

Savary et al.

[11] 3,899,050
[45] Aug. 12, 1975

[54] LINING FOR BRAKE SHOES
[75] Inventors: Wolf Savary, Leverkusen; Hartmut Soennecken, Halver, both of Germany
[73] Assignee: Textar GmbH, Leverkusen-Schlebusch, Germany
[22] Filed: Feb. 22, 1974
[21] Appl. No.: 445,030

Related U.S. Application Data
[63] Continuation-in-part of Ser. No. 267,725, June 29, 1972, abandoned.

[30] Foreign Application Priority Data
July 6, 1971 Germany............................ 2133455
Dec. 14, 1973 Germany............................ 2362190

[52] U.S. Cl. .............. 188/73.1; 51/298; 188/251 A; 192/107 M
[51] Int. Cl.[2] ......................................... F16D 69/02
[58] Field of Search .......... 188/73.1, 251 M, 251 A, 188/251 R; 192/107 M; 51/295, 298; 117/161 K, 161 L

[56] References Cited
UNITED STATES PATENTS

| | | | |
|---|---|---|---|
| 2,136,585 | 11/1938 | Bruce | 188/251 A X |
| 2,201,191 | 5/1940 | Matthews | 188/251 A X |
| 2,322,156 | 6/1943 | Oglesby | 51/295 |
| 2,784,105 | 3/1957 | Stedman et al. | 188/251 A X |
| 3,406,020 | 10/1968 | D'Alessandro | 51/295 X |
| 3,523,595 | 8/1970 | Massmann | 188/251 R |
| 3,547,609 | 12/1970 | Gerry | 51/298 |
| 3,655,609 | 4/1972 | Evans et al. | 192/107 M X |

FOREIGN PATENTS OR APPLICATIONS

| | | | |
|---|---|---|---|
| 886,844 | 1/1962 | United Kingdom | 192/107 M |
| 560,175 | 7/1958 | Canada | 188/251 R |

Primary Examiner—Trygve M. Blix
Assistant Examiner—Edward R. Kazenske
Attorney, Agent, or Firm—Markva & Smith

[57] ABSTRACT

The brake comprises a base plate having a friction lining on one surface thereof and an abrasive coating on the surface of the friction layer. The abrasive coating is designed to "break in" the rotating surface of a brake drum or disc, the thickness of the abrasive coating being only sufficient to accomplish this. The surface of the abrasive coating is irregular with interrupted rib-like projections to prevent the abrasive material from itself producing scratches in the rotating surface of the drum or disc. Once the abrasive coating has worn off, the friction lining operates in the normal manner frictionally contacting the drum or disc surface upon the application of pressure.

12 Claims, 3 Drawing Figures

LINING FOR BRAKE SHOES

This is a continuation-in-part application of our co-pending application Ser. No. 267,725 filed June 29, 1972, now abandoned.

This invention is concerned with an improved lining for brake shoes, particularly for use on motor vehicles and in industrial machines.

Brakes, generally of the drum or disc type, include at least one shoe arranged to frictionally engage a rotating surface on the drum or disc. Each shoe includes a friction-resistant layer or "lining" designed to contact the metal surface of the drum or disc. The lining, which is resistant to heat generated by friction during contact with the surface of the drum or disc, usually comprises a mixture of a cured organic or inorganic binder and a filler material. Natural and synthetic resins and rubber compounds are frequently used as binders, the filler consisting of asbestos and/or mineral wool, metal chips, metal oxides or other abrading materials distributed in the binder.

The surfaces of new brake drums and discs contacted by the friction lining frequently have small scores or other surface variations and are adversely affected by temperature and atmospheric conditions between the time these surfaces are machined and the time the drums or discs are installed on vehicles and machines. The result is that the action of the brake is impaired and unequal braking action occurs.

Various systems have been devised to eliminate imperfections in the drum or disc surfaces. A finally divided abrasive material has been incorporated along with the filler particles in the binder of the friction layer or lining. Though the abrasive material does serve to eliminate surface imperfections on the drum or disc resulting in improved braking action, the drum or disc surface is continuously subjected to the abrasive material resulting in substantially increased wear and reduced life for the brake drum or disc.

Another method of eliminating the surface imperfections in the drum or disc has been to initially install grinding blocks having the same dimensions and shape as the brake linings and to "break in" the drum or disc for a period of time using the grinding blocks for braking, after which the grinding blocks are replaced with the standard brake shoes with the friction lining. This offers the disadvantage, however, that the brake assemblies must be dismantled to substitute the brake shoes with the friction linings for the grinding blocks. This is a time-consuming and expensive operation.

Other attempts have been made to break in the drum or disc surface by coating the standard friction lining with a solidified polishing paste, the binder of which decomposes when subjected to heat generated by friction. The disadvantage of this arrangement is that the polishing or grinding layer is converted to a paste by the heat, which paste is not effective in eliminating deep surface imperfections on the drum or disc. The paste may serve to remove a light rust layer on the surface, but it will not remove deeper surface imperfections.

It also has been known to apply a layer of abrasive material of predetermined thickness to the surface of the friction lining such that the layer of abrasive material is brought into operative engagement with the drum or disc surfaces. The layer of abrasive material comprises abrasive particles together with a binder and serves to clean the coacting surface of the drum or disc when the brake is first used. The abrasive layer serves to grind the coacting surface smooth and any surface variations in the drum or disc can be obviated to a certain depth. After the abrasive layer applied to the friction lining has worn, the friction lining itself comes into contact with the surface of the drum or disc.

It has been found that the abrasive coatings applied to the friction lining are unsuitable for smoothing out scratches or grooves or deep rust pitting on the surface of the brake or disc due to mechanical stresses. Moreover, the abrasive layer may itself contribute to scratching the coacting surface of the drum or disc when some of the abrasive particles upon being loosened from the abrasive layer remain between the friction lining of the brake shoe and the coacting surface of the drum or disc. There is no transverse displacement of the friction lining of the brake shoe relative to the coacting surface of the drum or disc to discharge the loose abrasive particles before they scratch the coacting surface.

It is an object of the present invention to provide a brake shoe which will act on the drum or disc surface to remove all surface imperfections.

It is a further object of the invention to provide a brake shoe having an abrasive layer on the friction lining which will serve to eliminate surface imperfections such as scratches or grooves and other irregularities in the surface of the drum or disc to break in the drum or disc surface for only a limited period of time without excessively grinding the surface of the drum or disc and reducing its life expectancy.

It is a still further object of the invention to provide a brake shoe with an abrasive layer on the friction lining in which the abrasive particles of the abrasive layer will not themselves scratch the coacting surface of the drum or disc.

The above as well as other objects, features and advantages of the invention will become apparent and better understood by reference to the following detailed description when considered in connection with the accompanying drawings wherein.

A brake shoe shown generally at 1 comprises a base plate 2 having applied thereto a friction lining 3. A layer 4 of abrasive material of predetermined thickness is located on the surface of the friction lining 3.

Figure 1:
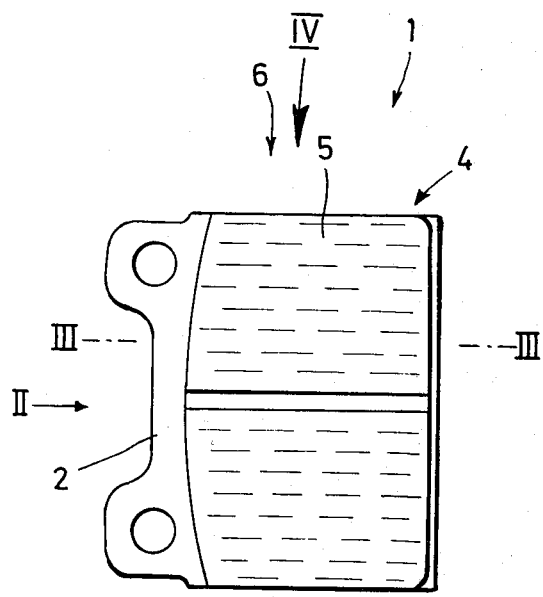
FIG. 1 is a plan view of a disc-type brake shoe embodying the invention.
Figure 2:
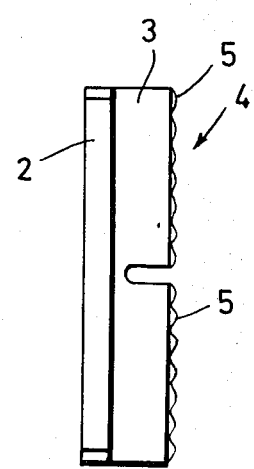
FIG. 2 is an end view of the brake shoe of FIG. 1 as seen in the direction of arrow II.
Figure 3:
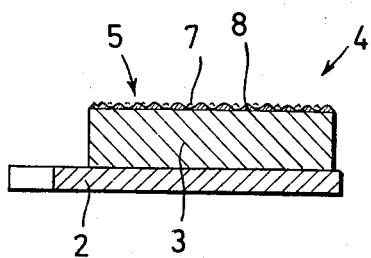
FIG. 3 is a sectional view of the brake shoe of FIG. 1 taken on the line III—III of FIG. 1.

The surface of the abrasive layer 4 includes rib-like projections 5 which extend in a direction substantially perpendicular to the direction of movement of the coacting surface of the disc. The direction of movement of the coacting surface of the disc is illustrated by the arrow IV in FIG. 1. The rib-like projections do not have a uniform height over their entire length but rather have interruptions 7 of varying regularity in the direction of the longitudinal axis of the rib-like projections. Thus, the rib-like pattern of the projections 5 comprises a plurality of humps 8 which are situated at varying distances from each other and between which there are interruptions 7. Though the humps 8 are irregularly spaced, it is essential that the distribution of the humps 8 in the plurality of rib-like projections is such that there is at least one hump present in an imaginary line extending in the direction of movement (arrow IV) of the coacting surface of the disc.

The surface design of the abrasive layer 4 prevents any scratches forming on the coacting surface of the drum or disc caused by the action of abrasive particles loosened from the abrasive layer. Discharge of abrasive particles from between the brake or disc surface and the abrasive layer is ensured.

The abrasive layer 4 comprises a particulate filler or grinding material and a heat-resistant binder capable of withstanding the high temperatures generated by the frictional contact of the friction layer with the drum or disc surface without decomposing.

Examples of suitable particulate fillers which are composed of natural and synthetic abrasive and polishing materials include carborundum, corundum ($Al_2O_3$), ground pumice, silicon carbide (SiC), zirconium sand ($ZrO_2$), powder glass, quartz ($SiO_2$), chromic oxide ($Cr_2O_3$), or mixtures of these materials. The particle size of the filler or abrasive particles preferably ranges between about 10 and 125 microns, the majority preferably ranging between about 20 and 40 microns.

The binder preferably is composed of one or more thermosetting resins as for example novolaks or two-stage resins based on a phenol such as cresol and xylenol containing inter alia 4 to 15 percent of hexamethylene tetramine; the resols or one-stage resins based on phenol or phenol derivatives such as cresol, xylenol and formaldehyde; the modified novolaks or resol resins which may be modified with polyvinyl formal, cashew (cardolite) and the like; and the drying alkyd resins based on linseed oil, ricinene oil, castor oil, and the like.

The filler or grinding material used in the grinding layer preferably constitutes about 65–75 percent by weight while the binder preferably constitutes about 35–25 percent by weight of the abrasive layer.

The thickness of the abrasive layer on the friction lining preferably ranges between about 0.3 and 0.6 mm. A precise accurately defined thickness for the abrasive layer ensures that there will be a precise predetermined degree of wear before the friction lining becomes operative.

It is important that the abrasive layer have sufficient thermal stability which should be at least equal to the thermal stability of the friction layer or lining. The minimum thermal stability of the abrasive layer is determined by: a) the selection of binder, and b) the degree of curing achieved by thermal treatment. By "minimum thermal stability" it is meant that at a temperature of 500°C less than 7 percent by weight of the binder is decomposed or disintegrates and no measurable decomposed portion can be detected by thermographic analysis at the operating temperature of the brake.

Conveniently, the binder or binders used in the abrasive layer can be the same as the binders used in the friction lining.

The brake shoe may be produced by first applying the friction lining 3 to the base plate 2, the friction lining being pressed and subjected to some thermal treatment. The abrasive layer 4 is then applied to the pressed friction lining in a manner such that the abrasive layer has an uneven thickness. This can be effected by applying the abrasive layer to the friction lining surface with a roller, the peripheral surface of the roller having a predetermined uneven surface. The preferred uneven surface of the roller is that capable of producing the surface on the abrasive layer illustrated in the drawings and described above wherein a plurality of rib-like projections 5 are provided, the rib-like projections comprising a plurality of irregularly spaced humps 8 separated by interruptions 7 of varying length. The predetermined surface of the roller must provide for the distribution of the humps 8 such that there is at least one hump present in any imaginary line extending in a direction transverse to the direction of the ribs 5.

The abrasive layer may alternatively be applied to the friction lining by spraying, brushing, etc.; but in any event, the predetermined uneven surface must be impressed in the abrasive layer.

After applying the abrasive layer to the friction lining the base plate with the two layers is placed in a heated oven to cure the binder both in the friction lining and the abrasive layer. It is therefore advantageous for the composition of the binder of both the abrasive layer and the friction lining to be the same. In this way the thermal curing of both the friction lining and abrasive layer can be carried out in a single operation at the same temperature.

It is advantageous for the abrasive layer and the material of the friction lining to have approximately the same friction value. The advantage of this is that if there is uneven wear on the brake shoes of a vehicle the vehicle will not pull to one side when braked during the transition from the abrasive layer to the friction lining. Furthermore, it is advantageous for the abrasive layer to have a temperature resistance equivalent to that of the friction lining. This will aid in assuring that the predetermined thickness of the abrasive layer of all the brake shoes on the vehicle will be worn down uniformly so that the friction lining comes into operation uniformly with respect to all of the brake shoes.

It is obvious that this invention is not to be considered as being limited to the exact form or use disclosed and that changes in detail and construction may be made therein within the scope of this invention without departing from the spirit thereof.

We claim:
1. A lining for brake shoes comprising
   a. a base layer comprising a filler and a binder for said filler for frictionally engaging an opposing relatively moving surface to brake said movement, and
   b. a coating on a surface of said base layer, said coating comprising a particulate abrasive material and a binder for said particulate abrasive material for initial grinding of said opposing relatively moving surface.
   c. said coating having a non-uniform thickness and the surface of said coating, for contacting said opposing relatively moving surface having an undulating configuration with rib-like projections when viewed in cross section, said rib-like projections being substantially parallel and discontinuous, each of said rib-like projections including a plurality of unequally spaced interruptions of varying length separated by unequally spaced humps, the humps of said plurality of rib-like projections being arranged such that there is at least one hump along any imaginary line extending in a direction transverse to said parallel rib-like projections, to permit abrasive particles loosened from said coating to be discharged, preventing said loosened particles from scratching said relatively moving surface.

2. A brake lining as defined in claim 1 wherein both said base layer and said coating have about the same friction value and temperature resistance to improve uniform wear of said coating and base layer and assure that any uneven wear will not affect the braking resistance of said lining.

3. A brake lining as defined in claim 2 wherein less than about 7 percent by weight of said binder decomposes at 500°C.

4. A brake lining as defined in claim 1 wherein said grinding material is selected from the group consisting of carborundum, corundum ($Al_2O_3$), ground pumice, silicon carbide (SiC), zirconium sand ($ZrO_2$), powder glass, quartz ($SiO_2$), chromic oxide ($Cr_2O_3$), and mixtures thereof.

5. A brake lining as defined in claim 1 wherein said binder is selected from the group consisting of phenol, cresol, xylenol, formaldehyde, cresol containing 4–15 percent by weight of hexamethylene tetramine, and xylenol containing 4–15 percent of hexamethylene tetramine.

6. A brake lining as defined in claim 1 wherein said abrasive composition comprises about 65–75 percent by weight grinding material and about 35–25 percent by weight binder.

7. A brake lining as defined in claim 1 wherein said particulate abrasive material has a particle size ranging between about 10 and 125 microns with the majority of said material having a particle size ranging between about 20 and 40 microns.

8. A brake lining as defined in claim 1 wherein the thermal stability of said coating is at least as great as the thermal stability of said base layer.

9. A brake lining as defined in claim 1 wherein the composition of said binders contained in said base layer and in said coating are the same.

10. A brake lining as defined in claim 1 wherein the thickness of said coating is between about 0.3 and 0.6 mm.

11. A lining for brake shoes comprising
   a. a base layer comprising a filler and a binder for said filler for frictionally engaging an opposing relatively moving surface to brake said movement, and
   b. a coating on a surface of said base layer, said coating comprising a particulate abrasive material and a binder for said particulate abrasive material for initial grinding of said opposing relatively moving surface,
   c. said coating having a non-uniform thickness and the surface of said coating, for contacting said opposing relatively moving surface, having an undulating configuration with rib-like projections when viewed in cross section, said rib-like projections extending in a direction substantially perpendicular to the direction of movement of said opposing surface, to permit abrasive particles loosened from said coating to be discharged, preventing said loosened particles from scratching said relatively moving surface.

12. In combination, at least one brake shoe having a lining thereon and an adjacent element mounted for movement along a path and having an opposing relatively moving surface for engagement by said lining, said lining comprising
   a. a base layer comprising a filler and a binder for said filler for frictionally engaging said opposing relatively moving surface to brake said movement of said adjacent element,
   b. a coating on a surface of said base layer, said coating comprising a particulate abrasive material and a binder for said particulate abrasive material for initial grinding of said opposing relatively moving surface,
   c. said coating having a non-uniform thickness and the surface of said coating, for contacting said opposing relatively moving surface, having an undulating configuration with rib-like projections when viewed in cross section, said rib-like projections extending in a direction substantially perpendicular to the direction of movement along said path of said opposing surface of said adjacent element, to permit abrasive particles loosened from said coating to be discharged, preventing said loosened particles from scratching said relatively moving surface.

* * * * *